(12) United States Patent
Bogdanowicz

(10) Patent No.: US 12,020,833 B2
(45) Date of Patent: Jun. 25, 2024

(54) LED CONNECTORS IN WIRE HARNESS

(71) Applicant: Buyers Products Company, Mentor, OH (US)

(72) Inventor: Miroslaw Bogdanowicz, Hillsborough, NJ (US)

(73) Assignee: Buyers Products Company, Mentor, OH (US)

( * ) Notice: Subject to any disclaimer, the term of this patent is extended or adjusted under 35 U.S.C. 154(b) by 258 days.

(21) Appl. No.: 17/716,286

(22) Filed: Apr. 8, 2022

(65) Prior Publication Data
US 2022/0324396 A1   Oct. 13, 2022

Related U.S. Application Data

(60) Provisional application No. 63/172,858, filed on Apr. 9, 2021.

(51) Int. Cl.
*B60R 16/02* (2006.01)
*H01B 7/00* (2006.01)
*H02P 5/68* (2006.01)
*E01H 10/00* (2006.01)

(52) U.S. Cl.
CPC .............. *H01B 7/0045* (2013.01); *H02P 5/68* (2013.01); *B60R 16/0207* (2013.01); *E01H 10/007* (2013.01)

(58) Field of Classification Search
CPC ..... B60R 16/0207; H01B 7/0045; H02P 5/68; E01H 10/007

USPC .......... 439/960, 309, 324, 176, 340, 620.15, 439/620.25, 949; 318/17

See application file for complete search history.

(56) References Cited

U.S. PATENT DOCUMENTS

2021/0119669 A1*   4/2021   Critchard ................ E21B 21/10
2022/0021210 A1*   1/2022   Cairoli .............. H02J 13/00006

* cited by examiner

*Primary Examiner* — Jorge L Carrasquillo
(74) *Attorney, Agent, or Firm* — Emerson, Thomson & Bennett, LLC; Roger D. Emerson

(57) ABSTRACT

A wire harness includes a first connector portion that matingly connects to a second connector portion. A power cable carries electrical power from a power supply to one or more motors, and includes power segments connecting the first connector portion and the power supply, and the second connector portion and the motor. Power terminals are received within the first and second connector portions, for establishing an electrical connection between the power segments. One or more communication cables carry control signals from a control system to the motor(s) and include communication segments connecting the first connector portion and the control system and the second connector portion and the motors. Optical terminals are received within the first and second connector portions for each communication cable, for establishing a digital optical connection between each of first and second communication segments.

11 Claims, 5 Drawing Sheets

LED CONNECTORS IN WIRE HARNESS

I. BACKGROUND

A. Technical Field

This invention pertains to the field of spreaders for spreading material such as rock salt onto a surface such as a roadway.

B. Description of Related Art

Spreaders are conventionally mounted onto a vehicle such as a truck. Spreaders include a hopper for retaining a volume of material such as rock salt. The hopper includes a motor-driven component such as a pintle chain for moving the material from the bottom of the feed hopper onto a motor-driven spinner disc, which centrifugally dispenses the material from the back of the vehicle onto the surface such as roadway, driveway, etc. These motor-driven components are powered by the vehicle battery.

Both the hopper and the spinner disc have separately controlled motors. The feed motor in the hopper varies the rate of dispensing a quantity of material while the spinner motor varies the radial distance over which the material is spread. A fast feed motor speed and a slow spinner motor speed results in a thick layer of material spread over a narrow path while a slow feed motor speed and a fast spinner motor speed results in a thin layer of material spread over a wide path. In this way, the controller can selectively actuate the two motors for any desired application of material.

The hopper and spinner motors are mounted on the back of a vehicle, near the rear bumper, on top of the spreader. A wire harness is used to connect the controller to the vehicle battery. The wire harness thus provides electrical power and communications signals to the motors from the controller. The wire harness is typically formed of copper wire with copper electrical connections. Most of the common control system problems are actually the result of wire harness problems.

The connection in the wire harness is the most unreliable connection of the spreader system. It is exposed to the weather elements which include moisture, salt, sand, etc. As shown in the connection 10 of FIG. 1, metal terminals 12, 14, 16 in the wiring harness can corrode from exposure to these elements. In particular, copper communication terminals 12 that connect the controller to the spinner motor and the copper communication terminals 14 that connect to the vibrator motor suffer from this problem due to their location on the vehicle, in the rear, near the roadway. When the terminals corrode, signal can be lost between the controller and the motors, resulting in an operational failure. The power terminals 16 that drive the motors can also corrode but such power terminals conduct more current and are thus heavier and more durable against corrosion than the smaller communication terminals 12, 14. In light of this problem, it would be beneficial to connect the controller to the spinner motor and vibrator motor with terminals that will resist corrosion by moisture, salt, and water.

II. SUMMARY

Provided in this disclosure is a wire harness, preferably for a spreader system. A first connector portion matingly connects to a second connector portion. A power cable carries electrical power from a power supply to a motor. The power cable includes a first power segment connecting the first connector portion and the power supply, and a second power segment connecting the second connector portion and the motor. First and second power terminals are respectively received within the first and second connector portions, for establishing an electrical connection between the first and second power segments. A communication cable carries a control signal from a control system to the motor. The communications cable includes a first communication segment connecting the first connector portion and the control system, and a second communication segment connecting the second connector portion and the motor. First and second optical terminals are respectively received within the first and second connector portions, for establishing a digital optical connection between the first and second communication segments.

In one aspect, the first optical terminal can include an LED (Light-Emitting Diode) communication terminal and the second optical terminal can include a solid state optical photodiode receiver terminal. These thereby define an LED/photodiode pair aligned and in registration so that light pulses from the LED communication terminal are received by the photodiode receiver terminal and transmitted through the wire harness to the motor.

The LED communications terminal is received within the first connector portion and connected to the first communication segment. In this way, the control signal is received from the control system and generates a digital light signal. The solid state optical photodiode receiver terminal is received within the second connector portion and connected to the second communication segment, for receiving the digital light signal and transmitting the control signal to the motor.

The LED communications terminal includes a light-emitting diode that emits modulated light corresponding to an electrical waveform of the control signal from the control system. The photodiode of the receiver terminal receives the modulated light and converts it back into the electrical waveform of the control signal that is received at the motor and used to control the motor. The first and second optical terminals can be LED transceivers that both emit and receive light.

In another aspect, the communication cable can be one of a plurality of communication cables for carrying a respective plurality of control signals from the control system to a respective plurality of motors. A respective plurality of pairs of first and second optical terminals are provided for establishing respective digital optical connections between first and second communication segments associated which each of the communication cables.

In yet another aspect, the plurality of motors can include a vibrator motor and a spinner motor of a spreader system. One of the LED/photodiode pairs can optically transmit the signal for the vibrator motor while the other LED/photodiode pair can optically transmit the signal for the spinner motor.

In still another aspect, a connector ring can be provided for joining the first and second connector portions and holding them together. In this way the first and second optical terminals are held together in alignment and registration so that optical communication can take place therebetween.

According to an aspect of the invention, a connection is provided that resists exposure to weather elements including moisture, salt, sand, etc.

According to another aspect of the invention, a signal connection is provided with reduced risk of corrosion.

According to still another aspect of the invention, a signal connection is provided that performs without the use of copper communication terminals.

Other benefits and advantages of this invention will become apparent to those skilled in the art to which it pertains upon reading and understanding of the following detailed specification.

III. BRIEF DESCRIPTION OF THE DRAWINGS

The disclosed LED connector arrangement may take physical form in certain parts and arrangement of parts, embodiments of which will be described in detail in this specification and illustrated in the accompanying drawings which form a part hereof and wherein.

IV. DETAILED DESCRIPTION

Figure 1:
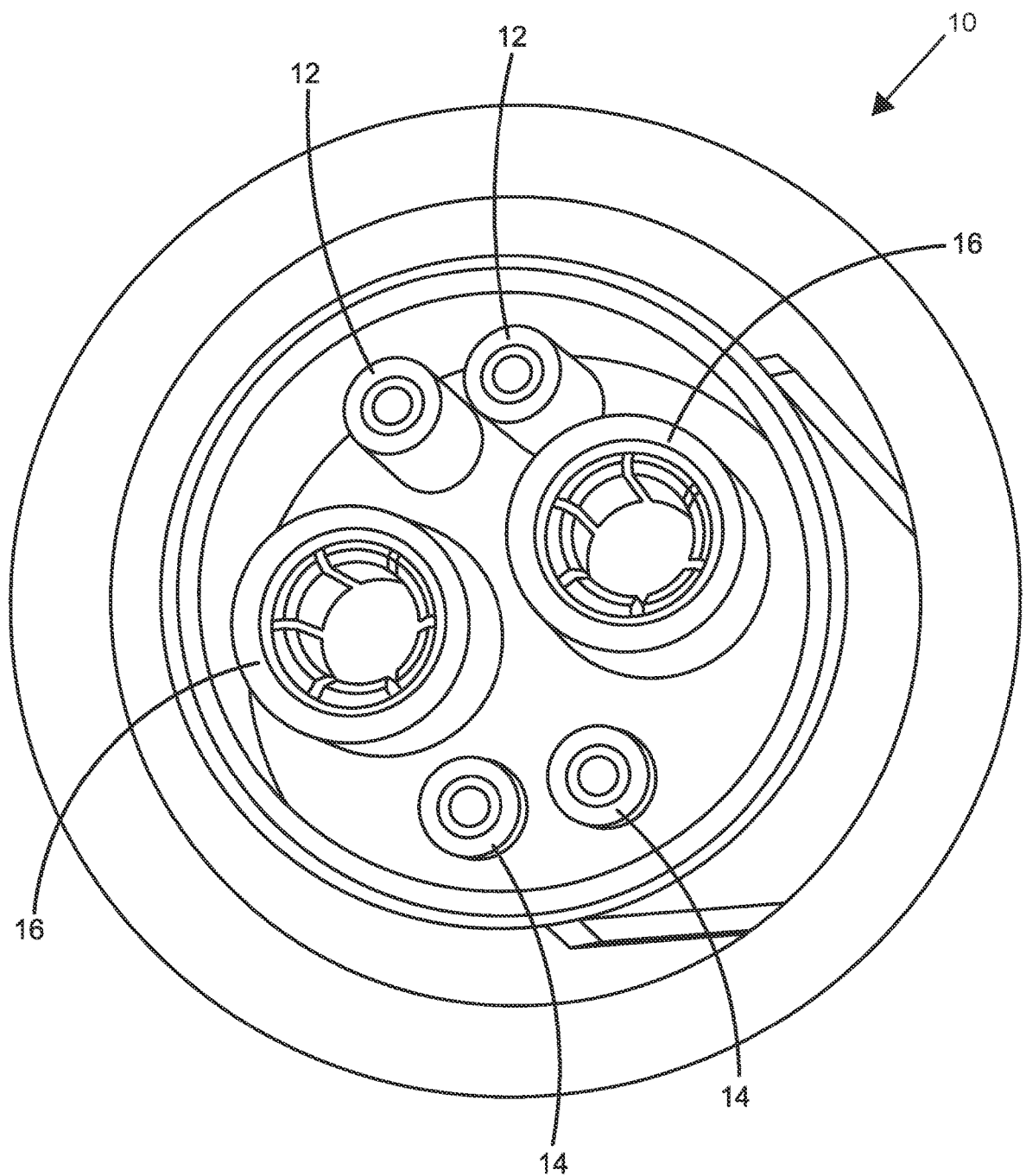
FIG. 1 is an end view showing a connector with copper terminals as typically used in a spreader system.
Figure 2:
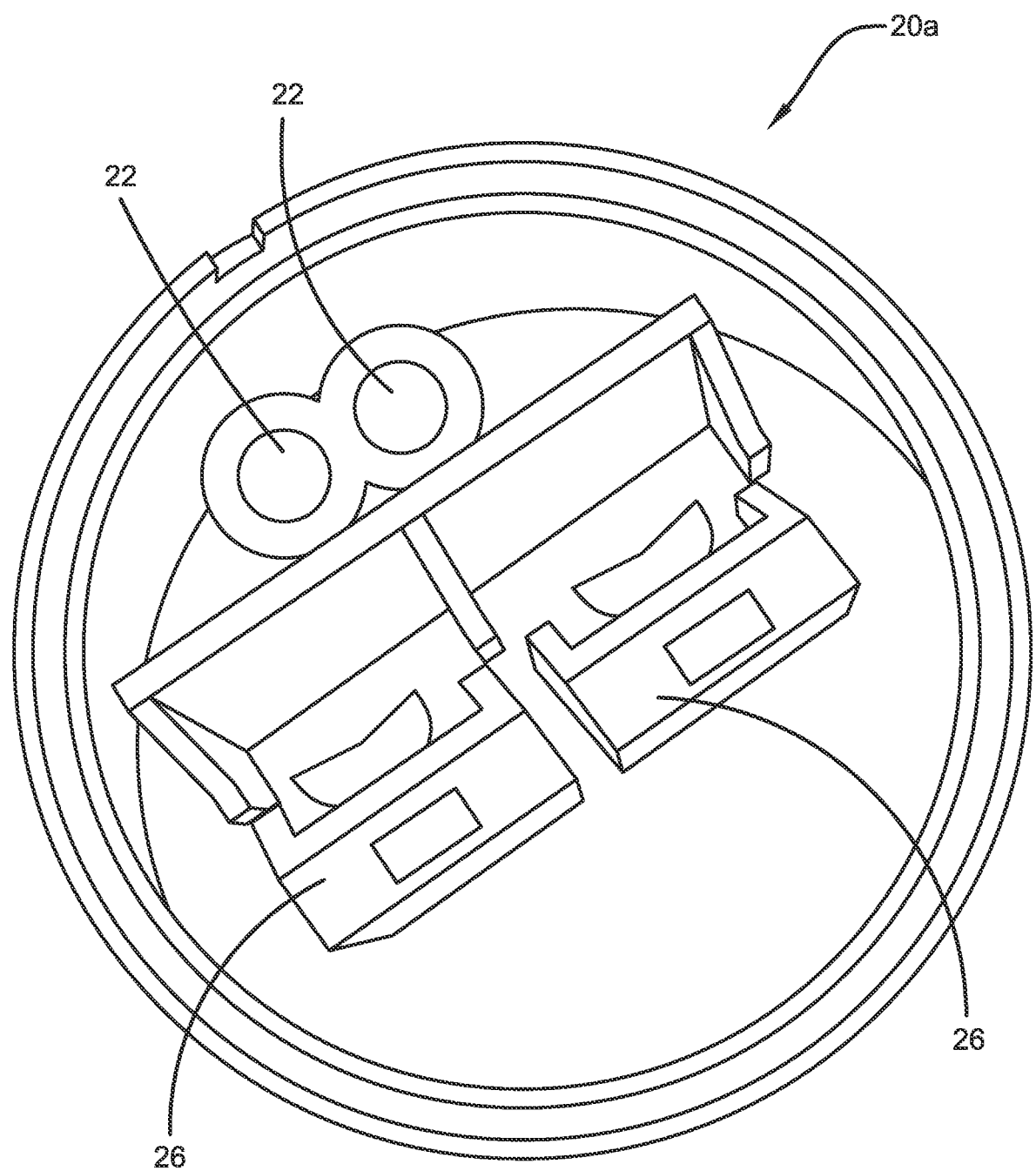
FIG. 2 is an end view showing a first connector portion having LED terminals as in a spreader system according to an exemplary embodiment of the present invention.
Figure 3:
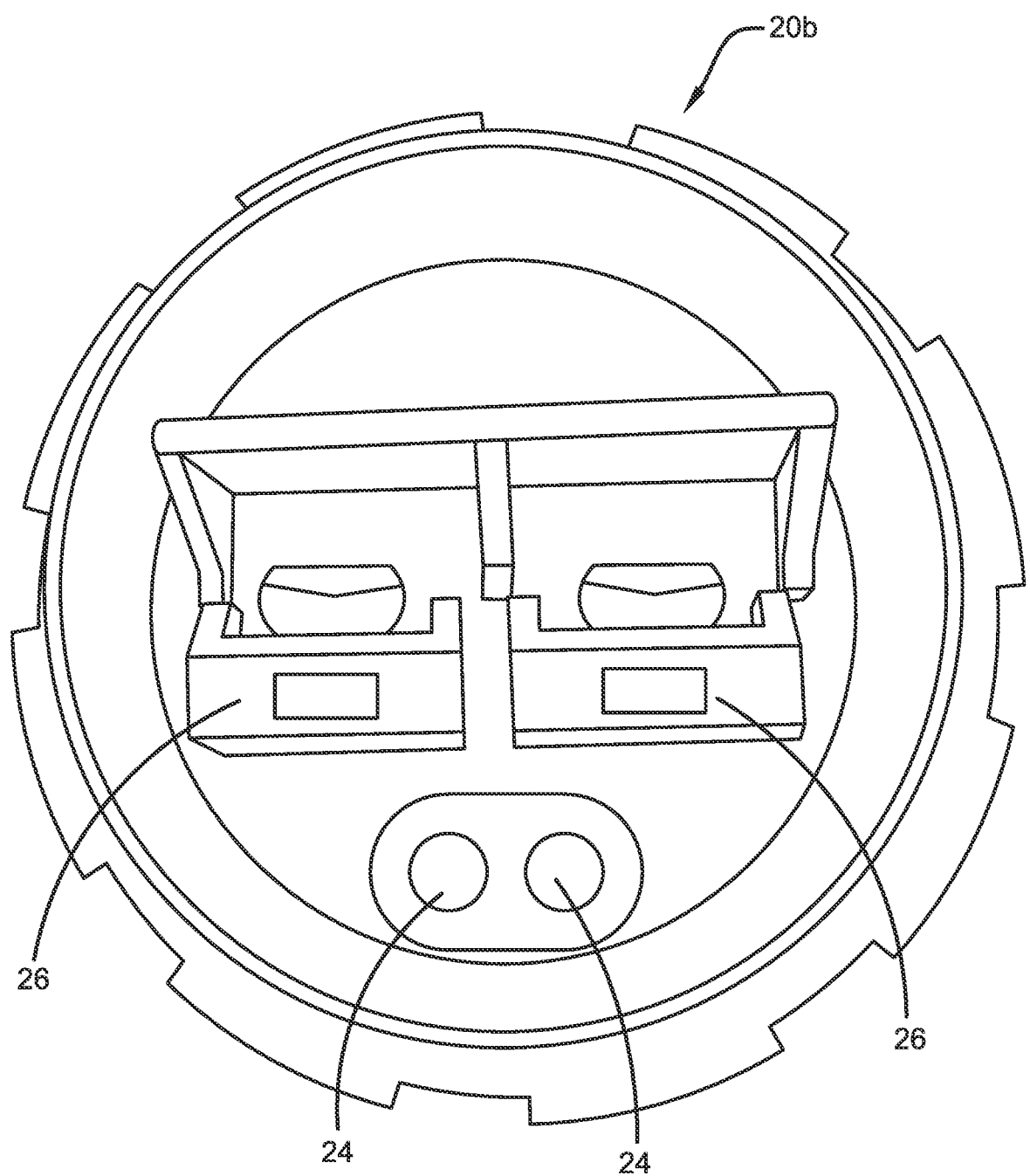
FIG. 3 is an end view showing a second connector portion having LED terminals as in the spreader system according to the exemplary embodiment of the present invention.

Referring now to the drawings wherein the showings are for purposes of illustrating embodiments of the article only and not for purposes of limiting the same, and wherein like reference numerals are understood to refer to like components:

FIG. 2 shows an end view of a first connector portion 20a while FIG. 3 shows an end view of a second connector portion 20b. These connector portions 20a, 20b are configured such that the first connector portion 20a is matingly connected to the second connector portion 20b. As shown in FIGS. 2 and 3, a first optical terminal 22 and second optical terminal 24 are respectively received within the first and second connector portions 20a, 20b, for establishing a digital optical connection between the first and second communication segments.

The first optical terminal 22 is preferably an LED (Light-Emitting Diode) communication terminal 22 and the second optical terminal 24 is preferably a solid state photodiode terminal 24. As particularly shown in FIG. 2, a pair of LED communication terminals 22 is received within the first connector portion 20a. Instead of a standard mechanical connection between copper electrical terminals, the LED communication terminals 22 transmit an optical signal (i.e., a digital signal) that is received and transmitted to a respective pair of solid state optical photodiode receiver terminals 24 received within a second connector portion 20b, as shown in FIG. 3.

When properly assembled and connected, the LED communication terminals 22 and the photodiode terminals 24 are aligned and in registration. Light pulses from the LED communication terminals 22 are received and further transmitted through the wire harness to the respective motors, resulting in LED/photodiode pairs 22, 24. Each LED communications terminal 22 receives the control signal from the control system and generates a digital light signal. The solid state optical photodiode receiver terminal 24 receives the digital light signal and transmits the control signal to the motor. This is accomplished in the LED communications terminal 22 by a Light-Emitting Diode that emits modulated light corresponding to an electrical waveform of the control signal from the control system. The photodiode of the receiver terminal 24 receives the modulated light and converts it back into the electrical waveform of the control signal that is received at one of the motors and used to control the respective motor.

In the preferred embodiment, one of the photodiode pairs 22, 24 can optically transmit the signal for the vibrator motor while the other LED/photodiode 22, 24 can optically transmit the signal for the spinner motor. In an alternate embodiment, the instead of a distinct LED transmitter and photodiode receiver components, the first and second optical terminals 22, 24 can be LED/photodiode pairs where both respective terminals 22, 24 can employ LED transceivers that both emit and receive light, an LED element that functions as both a Light-Emitting Diode and a photodiode.

As described hereinabove, the LED/photodiode pairs 22, 24 eliminate the mechanical connection and thereby reduce the instance of metal corrosion in communication terminals, thereby avoiding signal loss due to corrosion. LEDs used in optical communication terminals are typically made of nonmetallic materials such as polycarbonate, glass, or similar materials that resist corrosion. An LED (Light-Emitting Diode) emits modulated light corresponding to an electrical signal from the controller while a photodiode can receive the modulated light from the LED and convert it back into an electrical signal that is received at the motor and used to control the motor.

As also shown in FIGS. 2 and 3, the first and second connector portions 20a, 20b also include first and second power terminals 26 that establish an electrical connection and thereby supply electrical power to drive the motors. It is to be appreciated that the power terminals 26 are preferably conventional copper conductors for carrying electrical current. The power terminals 26 are of sufficient size that they will resist corrosion more readily than the smaller conductors that had previously been known and used for communication terminals, as explained hereinabove.

Figure 4:
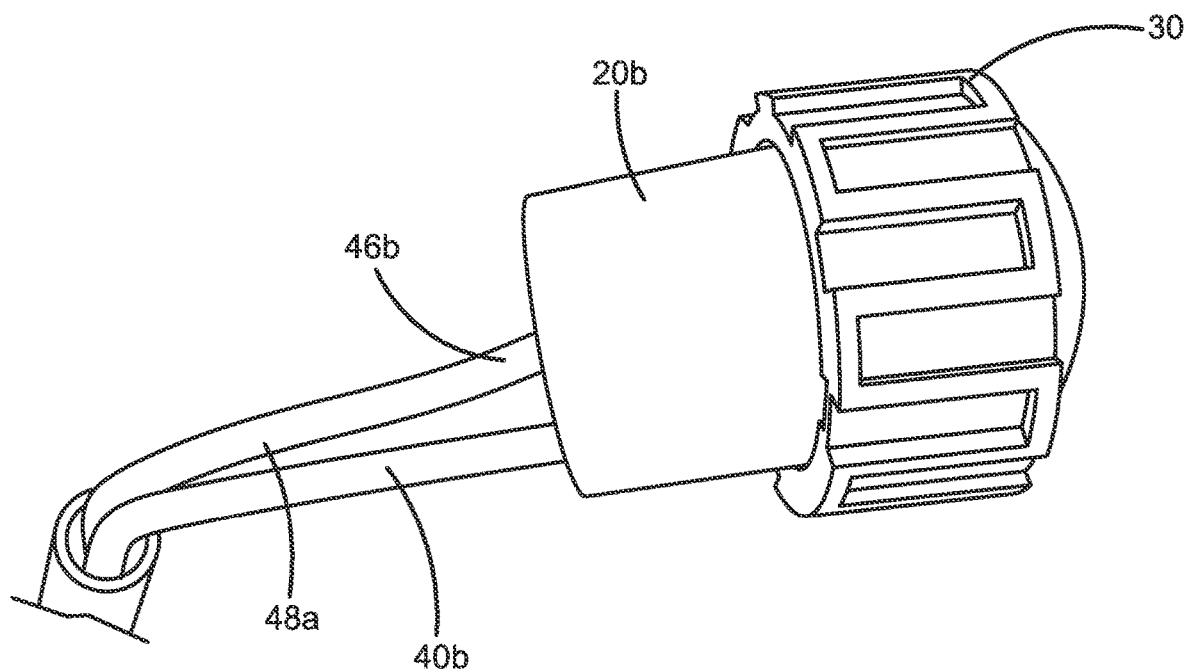
FIG. 4 is a side view showing the second connector portion having the LED terminals as in the spreader system according to the exemplary embodiment of the present invention.
Figure 5:
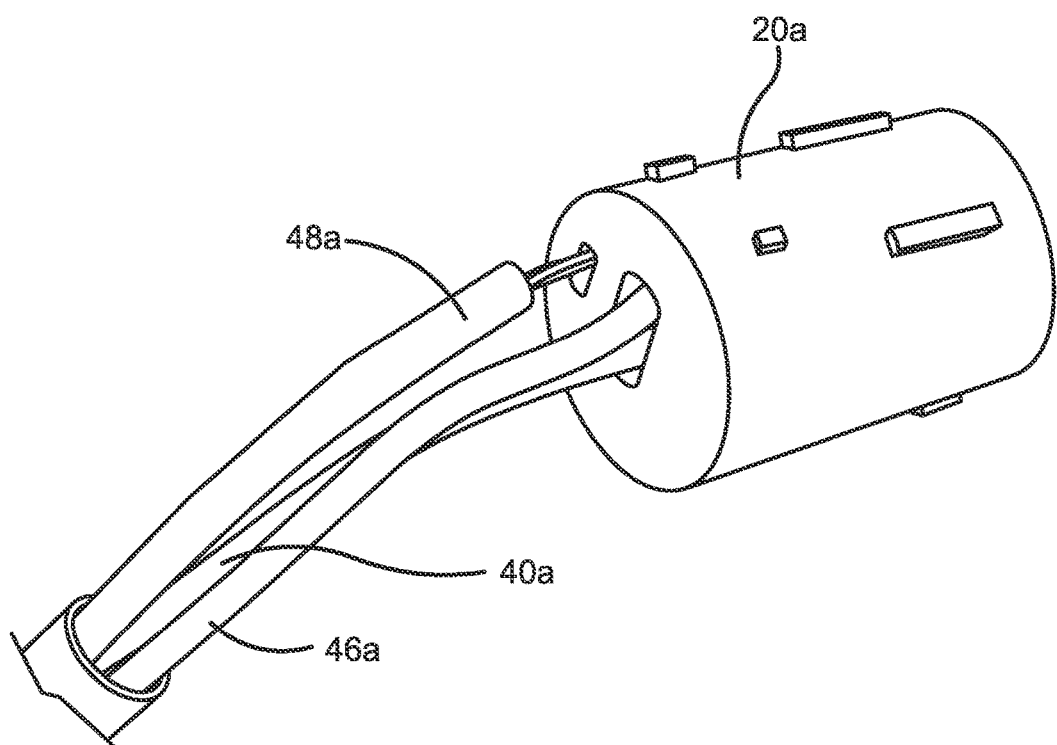
FIG. 5 is a side view showing the first connector portion having LED terminals as in the exemplary embodiment of the spreader system according to the exemplary embodiment of the present invention.

As shown in the side views of FIGS. 4 and 5, a wire harness includes the first and second connector portions 20a, 20b with a connector ring 30 for joining the connector portions 20a, 20b and holding them together in a mating connection so that the LED terminals 22 and the photodiode receivers 24 are held together in alignment and registration so that optical communication can take place therebetween. The connector ring 30 can include suitable mating threads that engage with counterpart structures on one or both of the connector portions 20a, 20b. Any other suitable mating connector structure can also be employed without departing from the invention.

Figure 6:
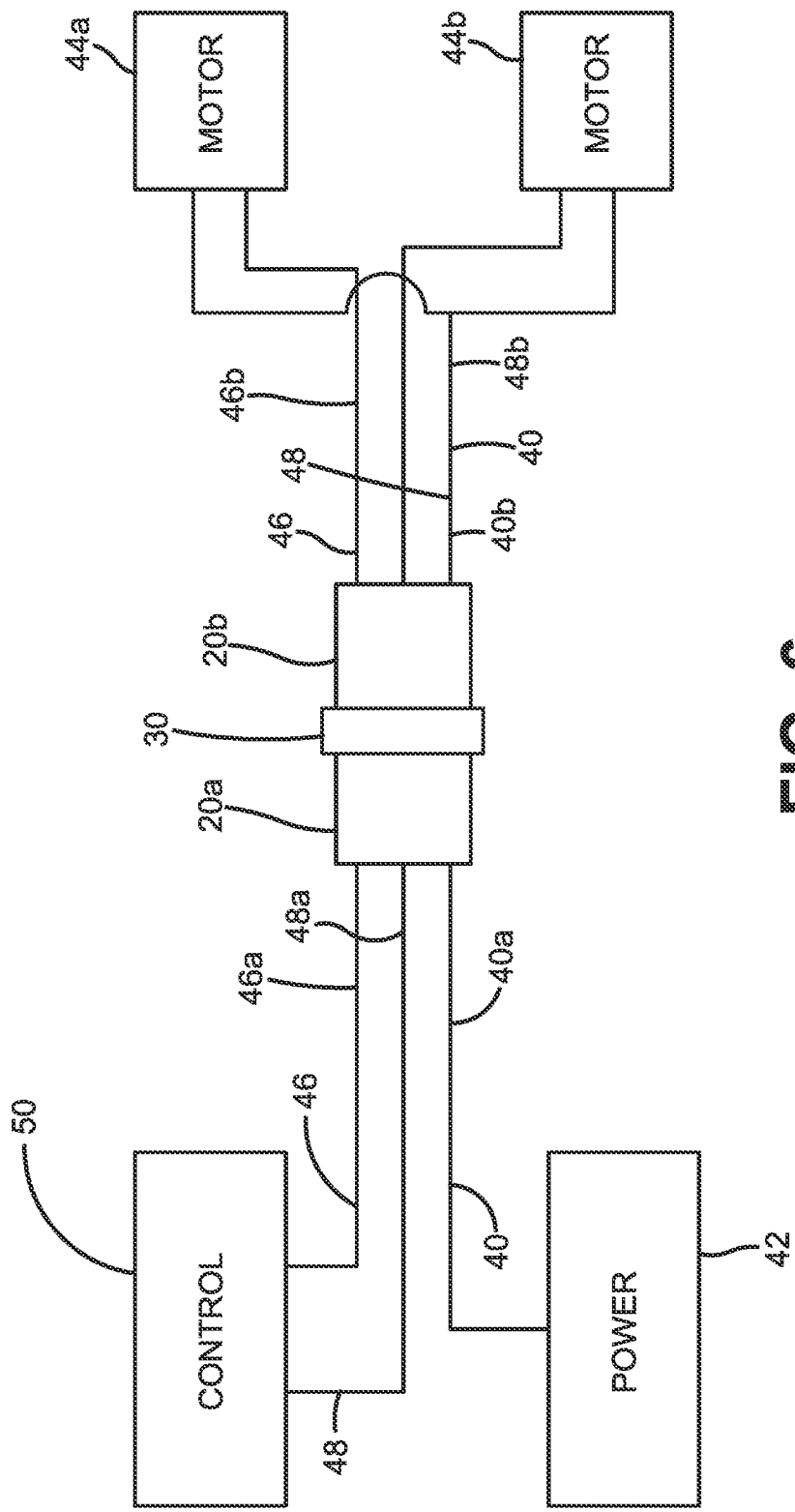
FIG. 6 is a schematic depicting the present wire harness as used with control and power systems for operating motors of the spreader system.

As further shown in FIGS. 4 and 5 and also FIG. 6, a power cable 40 is provided for carrying electrical power from a power supply 42 to one or more motors 44a, 44b. The power cable 40 as shown is a sheathed wire containing positive and negative electrical leads, as is commonly understood in the art. The power cable 40 is defined as a first power segment 40a connecting the first connector portion 20a and the power supply 42, where the first power segment 40a also includes positive and negative leads. The power cable 40 is also defined by a second power segment 40b connecting the second connector portion 20b and the motors 44a, 44b, where the second power segment 40b also includes positive and negative leads. It is to be appreciated that the first and second power terminals 26, respectively received within the first and second connector portions 20a, 20b, are electrically connected respectively to the positive and negative leads of the first and second power segments 40a, 40b, for establishing an electrical connection therebetween.

As additionally shown in FIGS. 4, 5, and FIG. 6, a pair of communication cables 46, 48 are provided for carrying a control signal from a control system 50 to the motors 44a, 44b. The communications cables 46, 48 are each defined respectively by a first communication segment 46a, 48a connecting the first connector portion 20a and the control system 50. The communication cables 46, 48 are also each defined respectively by a second communication segment 46b, 48b connecting the second connector portion 20b and the motors 44a, 44b. It is to be appreciated that the communication cables 46, 48 and the respective communication segments 46a, 46b, 48a, 48b also include positive and negative leads, as understood in the art.

In an exemplary embodiment, the motors can include a vibrator motor 44a and a spinner motor 44b of a spreader system. However, it is to be appreciated that a plurality of communication cables can be implemented for carrying a respective plurality of control signals from the control system 50 to a respective plurality of motors. It is to be further understood that a respective plurality of pairs of first and second optical terminals 22, 24 would be suitably employed for establishing respective digital optical connections between first and second communication segments associated which each of the communication cables, all without departing from the invention.

Numerous embodiments have been described herein. It will be apparent to those skilled in the art that the above methods and apparatuses may incorporate changes and modifications without departing from the general scope of this invention. It is intended to include all such modifications and alterations in so far as they come within the scope of the appended claims or the equivalents thereof.

What is claimed:

1. A wire harness, comprising:
a first connector portion for matingly connecting to a second connector portion;
a power cable for carrying electrical power from a power supply to a motor, wherein the power cable comprises a first power segment connecting the first connector portion and the power supply, and a second power segment connecting the second connector portion and the motor;
first and second power terminals, respectively received within the first and second connector portions, for establishing an electrical connection between the first and second power segments;
a communication cable for carrying a control signal from a control system to the motor, wherein the communications cable comprises a first communication segment connecting the first connector portion and the control system, and a second communication segment connecting the second connector portion and the motor; and
first and second optical terminals, respectively received within the first and second connector portions, for establishing a digital optical connection between the first and second communication segments.

2. The wire harness of claim 1, wherein the first optical terminal comprises an LED communication terminal and the second optical terminal comprises a solid state optical photodiode receiver terminal, thereby defining an LED/photodiode pair aligned and in registration so that light pulses from the LED communication terminal is received by the photodiode receiver terminal and transmitted through the wire harness to the motor.

3. The wire harness of claim 2, wherein the LED communications terminal is received within the first connector portion and connected to the first communication segment, for receiving the control signal from the control system and generating a digital light signal, and wherein the solid state optical photodiode receiver terminal is received within the second connector portion and connected to the second communication segment, for receiving the digital light signal and transmitting the control signal to the motor.

4. The wire harness of claim 3, wherein the LED communications terminal comprises a light-emitting diode that emits modulated light corresponding to an electrical waveform of the control signal from the control system, wherein the photodiode of the receiver terminal receives the modulated light and converts it back into the electrical waveform of the control signal that is received at the motor and used to control the motor.

5. The wire harness of claim 1, wherein the communication cable is one of a plurality of communication cables for carrying a respective plurality of control signals from the control system to a respective plurality of motors, further comprising a respective plurality of pairs of first and second optical terminals for establishing respective digital optical connections between first and second communication segments associated which each of the communication cables.

6. The wire harness of claim 1, wherein the plurality of motors comprise a vibrator motor and a spinner motor of a spreader system.

7. The wire harness of claim 1, further comprising a connector ring for joining the first and second connector portions and holding them together so that the first and second optical terminals are held together in alignment and registration so that optical communication can take place therebetween.

8. The wire harness of claim 1, wherein the first and second optical terminals comprise LED transceivers that both emit and receive light.

9. A wire harness for a spreader system, comprising:
a first connector portion for matingly connecting to a second connector portion;
a power cable for carrying electrical power from a power supply to a plurality of motors, wherein the power cable comprises a first power segment connecting the first connector portion and the power supply, and a second power segment connecting the second connector portion and the motor;
first and second power terminals, respectively received within the first and second connector portions, for establishing an electrical connection between the first and second power segments;
a plurality of communication cables for carrying a respective plurality of control signals from a control system to the respective plurality of motors, wherein each of the plurality of communications cables comprises a first communication segment connecting the first connector portion and the control system, and a second communication segment connecting the second connector portion and a respective one of the plurality of motors; and wherein each of the plurality of communication cables cooperate with respective first and second optical terminals, each respectively received within the first and second connector portions, for establishing a digital optical connection between the first and second communication segments.

10. A wire harness, comprising:
a first connector portion for matingly connecting to a second connector portion;
a power cable for carrying electrical power from a power supply to a motor, wherein the power cable comprises a first power segment connecting the first connector portion and the power supply, and a second power segment connecting the second connector portion and the motor;
first and second power terminals, respectively received within the first and second connector portions, for establishing an electrical connection between the first and second power segments;
a communication cable for carrying a control signal from a control system to the motor, wherein the communications cable comprises a first communication segment connecting the first connector portion and the control system, and a second communication segment connecting the second connector portion and the motor; and
an LED communications terminal is received within the first connector portion and connected to the first communication segment for receiving the control signal from the control system and generating a digital light signal, and a solid state optical photodiode receiver terminal received within the second connector portion and connected to the second communication segment, for receiving the digital light signal and transmitting the control signal to the at least one motor, thereby establishing a digital optical connection between the first and second communication segments.

11. The wire harness of claim 10, wherein the LED communications terminal comprises a light-emitting diode that emits modulated light corresponding to an electrical waveform of the control signal from the control system, wherein the photodiode of the receiver terminal receives the modulated light and converts it back into the electrical waveform of the control signal that is received at the motor and used to control the motor.

* * * * *